(12) United States Patent
Thomas et al.

(10) Patent No.: US 7,337,030 B2
(45) Date of Patent: Feb. 26, 2008

(54) AUTOMATED DERIVATIVE VIEW RENDERING SYSTEM

(75) Inventors: Mark Thomas, Auckland (NZ); Paul Delaney, Auckland (NZ); Mark Shafer, Auckland (NZ); David Dauncey, Auckland (NZ); Patrick Ashby, Auckland (NZ)

(73) Assignee: Right Hemisphere Limited, Auckland (NZ)

( * ) Notice: Subject to any disclaimer, the term of this patent is extended or adjusted under 35 U.S.C. 154(b) by 469 days.

(21) Appl. No.: 10/916,376

(22) Filed: Aug. 11, 2004

(65) Prior Publication Data

US 2005/0108215 A1 May 19, 2005

Related U.S. Application Data

(63) Continuation-in-part of application No. 10/387,248, filed on Mar. 12, 2003, now Pat. No. 7,092,974.

(51) Int. Cl.
*G06F 19/00* (2006.01)

(52) U.S. Cl. .......................... 700/98; 700/182; 345/420

(58) Field of Classification Search ................ 700/182, 700/98; 717/100; 345/420; 707/3, E17.026, 707/E17.031
See application file for complete search history.

(56) References Cited

U.S. PATENT DOCUMENTS 5,138,697 A * 8/1992 Yamamoto et al. ......... 345/420
6,133,916 A   10/2000 Bukszar et al.
6,281,874 B1   8/2001 Sivan
6,326,962 B1   12/2001 Szabo et al.
6,614,430 B1 * 9/2003 Rappoport .................. 345/420
6,985,835 B1 * 1/2006 Etzion et al. ................. 700/98
7,043,408 B2 * 5/2006 Camiener et al. ........... 700/182
2002/0080194 A1 * 6/2002 Fujieda ....................... 345/853
2003/0172366 A1 * 9/2003 Rhee et al. .................. 717/100
2004/0153824 A1 * 8/2004 Devarajan et al. ............ 714/38

OTHER PUBLICATIONS

Canto, "Cumulus 5.5 Why Upgrade?", Product Brochure, 2002.
Sclaroff et al., "ImageRover: A Content-Based Image Browser for the World Wide Web", 1977 IEEE, pp. 2-9.
Chaudhuri et al., "Optimizing Queries over Multimedia Repositories". ACM 1996, pp. 91-102, Canada.

\* cited by examiner

*Primary Examiner*—Kidest Bahta
*Assistant Examiner*—Steven R. Garland
(74) *Attorney, Agent, or Firm*—Vierra Magen Marcus & DeNiro LLP

(57) ABSTRACT

A system and method for creating a derivative view from graphical data which is derived from native application data. The native application data may be extracted from a graphical application, such as a CAD application, converted to an intermediate or derivative format, and a derivative view of the graphic information produced by the original, native application is provided from the intermediate format.

13 Claims, 11 Drawing Sheets

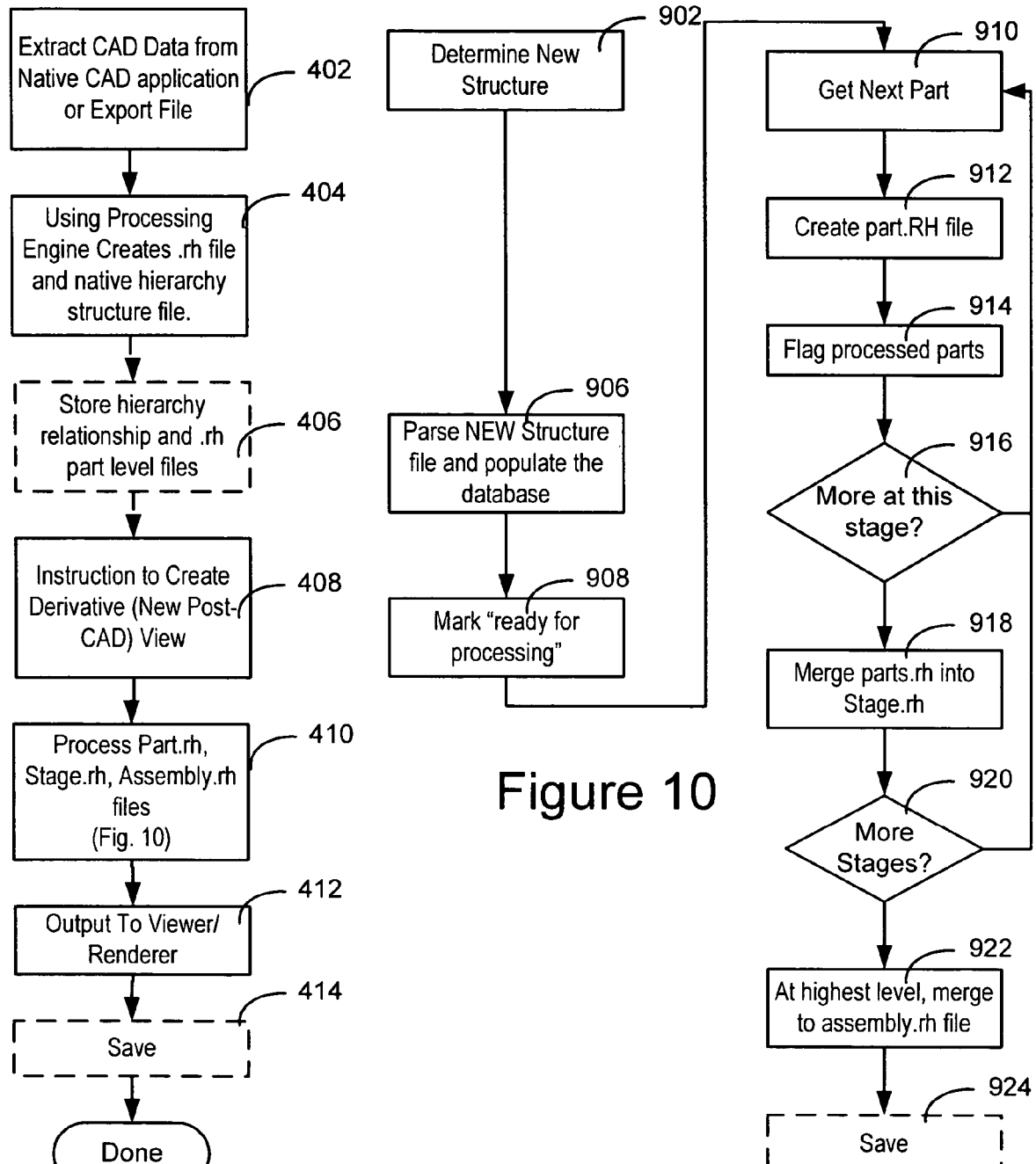

```
<part part_number="1234">
  <description>Top Part</description>
  <parent_id>0000</parent_id>
  <id>1111</id>
  <part part_number="2345">
    <description>2nd part</description>
    <parent_id>1111</parent_id>
    <id>2222</id>
    <filename>Part2</filename>
  </part>
  <part part_number="3456">
    <description>3rd Part</description>
    <parent_id>1111</parent_id>
    <id>3333</id>
    <filename>Part3</filename>
  </part>
  <part part_number="4567">
    <description>4th Part</description>
    <parent_id>3333</parent_id>
    <id>4444</id>
    <filename>Part4_1</filename>
    <filename>Part4_2</filename>
    <filename>Part4_3</filename>
    <filename>Part4_4</filename>
    <filename>Part4_5</filename>
    <filename>Part4_6</filename>
    <filename>Part4_7</filename>
    <filename>Part4_8</filename>
  </part>
</part>
```

Figure 7A

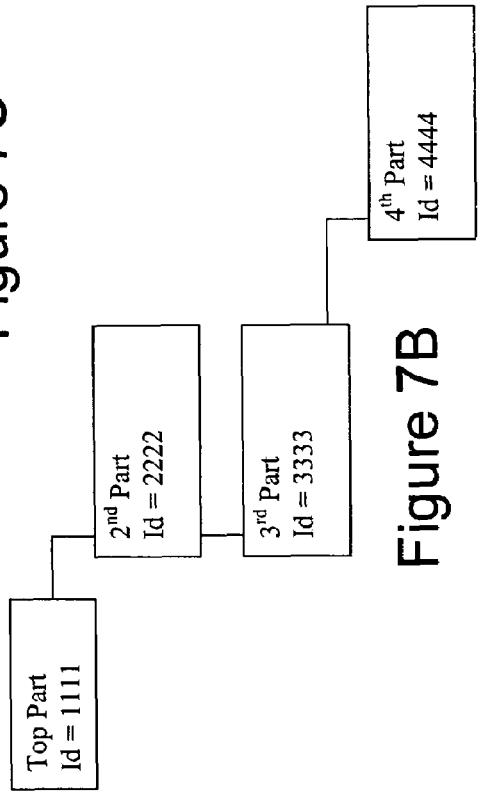

Figure 7B

```
<part part_number="7890">
  <description>NOT REQUIRED</description>
  <level>2</level>
  <version>YYY</version>
  <parent_id>456A662B4F2D3F59</parent_id>
  <id>41419197F2606BE9</id>
  <position1>1.000000</position1>
  <position2>0.000000</position2>
  <position3>0.000000</position3>
  <position4>0.000000</position4>
  <position5>1.000000</position5>
  <position6>0.000000</position6>
  <position7>0.000000</position7>
  <position8>0.000000</position8>
  <position9>1.000000</position9>
  <position10>0.000000</position10>
  <position11>0.000000</position11>
  <position12>0.000000</position12>
</part>
```

Figure 7C

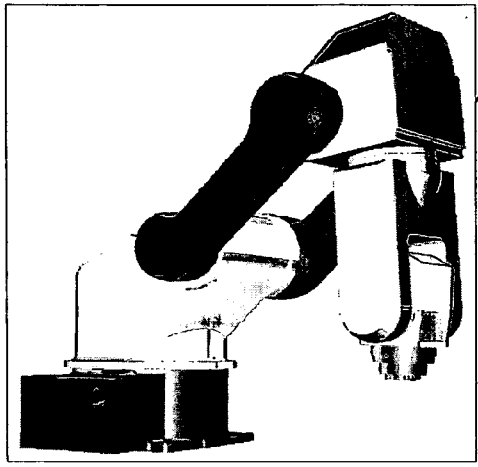
Figure 15
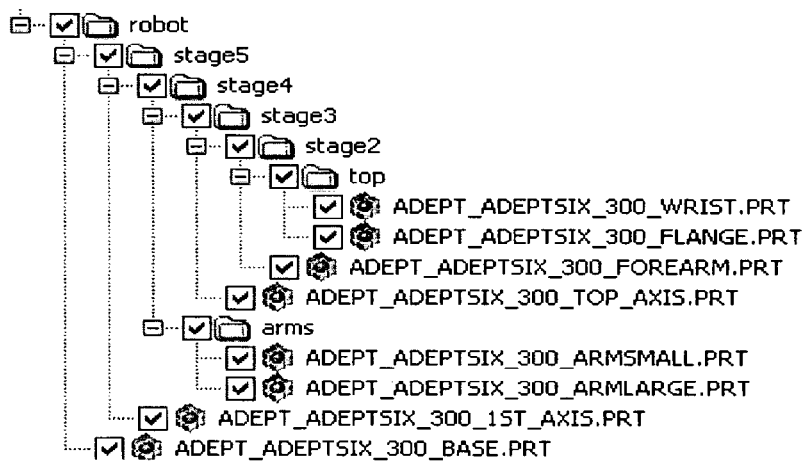
Figure 16
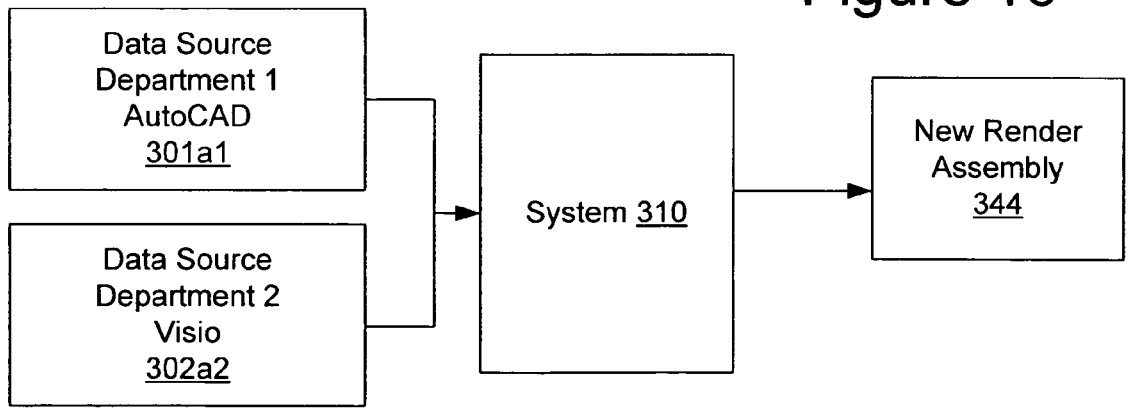

AUTOMATED DERIVATIVE VIEW RENDERING SYSTEM

CLAIM OF PRIORITY

This application claims the benefit under 35 U.S.C. § 120 of, and is a continuation-in-part of, U.S. patent application Ser. No. 10/387,248, entitled "Graphic File Management System," filed on Mar. 12, 2003, now U.S. Pat. No. 7,092,974 which is incorporated herein by reference.

BACKGROUND OF THE INVENTION

1. Field of the Invention

The present invention is directed to automated and dynamic repurposing of large amounts of digital graphic data or files.

2. Description of the Related Art

Graphical file information has become a major professional digital tool in business. Graphical file information can consist of items such as images, animations, live video, and CAD drawings. Graphical information is generally stored in vector graphics or raster graphics.

Traditionally, 2D and 3D graphical information has resided in pockets within an organization in different formats and physical locations which are often inaccessible to various different departments within the organization. Products used to create the different graphical files, marketing and other company departments. The costs associated with creating downstream visual communications for documentation, training and support of complex tasks in the product lifecycle are skyrocketing as products become more complex and varied. The need to gain control of these processes in a coordinated manner is now a paramount concern for any product-oriented enterprise wishing to stay competitive.

The efficient and effective use and re-use of engineering and design assets can provide significant business and strategic advantage to any engineering or manufacturing enterprise. In particular, the ability to collate data from different graphical applications, used by, for example, different departments, and output new views of the separate or combined data, would be particularly useful.

SUMMARY OF THE INVENTION

The invention, roughly described, comprises a system and method for creating a derivative view from graphical data which is derived from native application data. In one aspect, the native application data is extracted from a graphical application, such as a CAD application, converted to an intermediate or derivative format, and a derivative view of the graphic information produced by the original, native application is provided from the intermediate format.

In a further aspect, the invention is a method for creating a graphic view of a part. The method includes the steps of: extracting graphical data in a native application format; converting said graphical data from the native application format to a derivative graphical data format; receiving an instruction to provide a derivative view; and creating a derivative view of at least a portion of the graphical data from the derivative graphical data format.

In a further aspect, the graphical data includes a plurality of parts and may further include an assembly including a hierarchical relationship for said plurality of parts.

The step of converting may include providing a binary derivative graphical file for each said part, and a hierarchical data file.

In a further embodiment, the invention is a method for creating an assembly visualization. In this embodiment, the method includes the steps of: extracting graphical data from a CAD system, said graphical data including rendering data and a hierarchical structure; for each part in the assembly, creating a binary data representation of the part; receiving a new hierarchical structure for a new rendering view; and creating a binary merge file of a rendering the new assembly based on said part assemblies and said new hierarchical structure.

In yet another aspect, the invention is a system for rendering a derivative view of graphical data. The system includes a native format graphical data import engine, a derivative format graphical data store; and a derivative view creation engine interacting with the derivative graphical data store.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIG. 4 is a flowchart showing the general process for creating a derivative rendered graphical view from original graphical data provided by a graphics design system.

FIG. 7A is a portion of a hierarchal structure defined in XML utilized in accordance with the present invention.

FIG. 7B is a tree view of the XML structure shown in FIG. 7A.

FIG. 7C is a portion of a second type of graphical data defined in XML format utilized in accordance with the present invention.

FIG. 10 is a flow chart illustrating the process for creating a graphical data file structure utilized in accordance with the present invention.

FIGS. 11 through 15 are illustrations of the processing of hierarchal structures of the robot assembly and associated XML hierarchical data structures in accordance with the present invention.

FIG. 16 is a block diagram illustrating how data sources from different departments can be merged to create a new rendered assembly.

DETAILED DESCRIPTION

The system of the present invention allows users to retrieve information from various types of CAD and other graphical development systems and seamlessly author and integrate graphic files into standard business software applications.

In particular, the system of the present invention allows users to import graphical data from its native application format (or an export of such data to a commonly understood format), and provide a new, derivative view (or multiple views and assemblies) of such data.

For example, for users who use Computer Aided Design (CAD) applications to create graphic images or files, the system of the present invention allows such information to be imported, and altered to create new views, new assemblies, and/or be combined with information from other applications. The user can add images and data created in other 3D or 2D images applications, or perform other changes that are required to alter the original graphical images to suit other purposes ("repurpose").

Figure 1A:
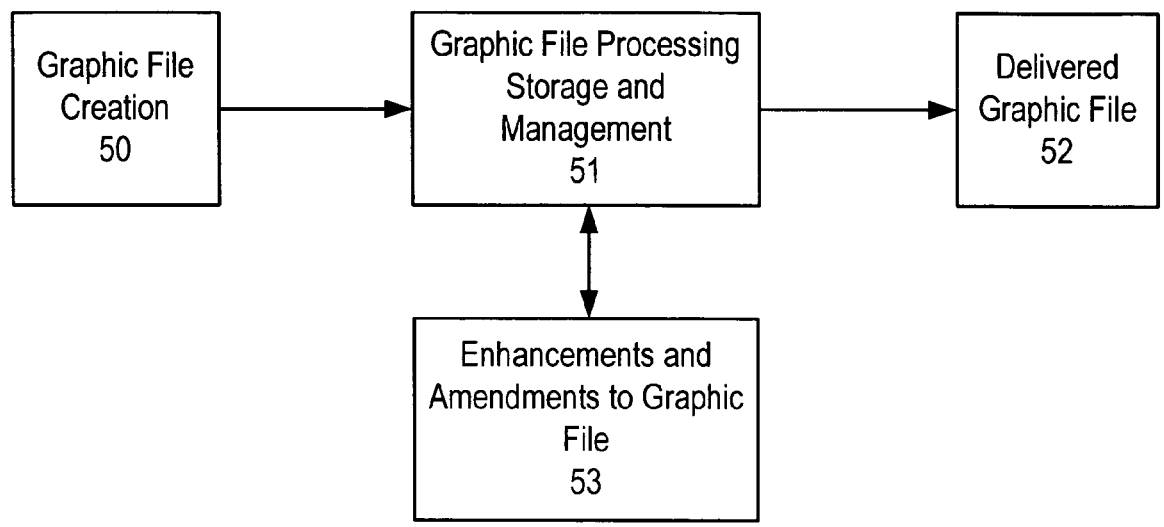
FIG. 1A is a block diagram of a typical graphic file workflow in accordance with the present invention.

In general, the system presents a method and apparatus for converting native graphical file information into a visualization using a more universal data format. FIG. 1 is a flow diagram of the typical workflow of graphic files. Graphic files typically move through a workflow starting from the creation of the graphic file 50, to data processing, storage and management 51, to the delivered file 52 (that is, use of the graphic file in published documents etc). In typical computer systems, it is difficult to maintain graphic files, particularly updates and amendments to the files. The graphic file management system of the present invention works to process, store and manage 51 graphic files as well as enable the tracking of enhancements, updating and amendments 53 to graphic files stored in or linked to the server and database.

In one embodiment, native application data is converted to a Universal Graphical Data Model (UGDM) which stores about the graphic files, including detailed image attributes, such as polygon counts, texture information, as well as information about the graphic files electronic file size and date created.

In general, when native graphical file information is imported into the system, the system will automatically convert the information into a system graphic file format (the UGDM), generally more efficient than the native format. The system may also automatically create certain initial derivative views of the information, such as a thumbnail view of the file.

The system of the present invention is capable of maintaining a connection between the source data of a particular graphic file and incremental changes made to its other versions manually by users or automatically by the server. Furthermore, data from multiple sources can be managed. For example, if a number of graphic files are wanted to be combined to form one large graphic files but each of the graphic files are in different formats as they were created by different computer users, the system can combine these into one graphic file. This is possible because the original file graphic data is extracted in conjunction with the original data's structural hierarchy information and original coordinate systems. The UGDM data may be stored in a database or a file system, or simply used to create derivative views and then discarded. Original coordinate systems can then be modified to fit a larger global coordinate system and so spatial, logical or date related searches may then be made of the database.

The graphic file management system of the present invention stores graphic files of 3D models and/or animation in such a way as to allow multiple users to edit model or animation data that may be in any different file formats. In the embodiment described herein, a graphical data format referred to as a ".RH format" is used.

The graphic file management system of the present invention allows multiple 3D graphic files containing assemblies, sub-assemblies and parts to be disassembled and recombined in new ways and into potentially much larger assemblies than ever before possible for the purposes of project overview and management, interference checking, visualization, training, technical documentation, and many other purposes requiring more lightweight data of potentially much larger assemblies than have ever before been combined. This is achieved by the system breaking existing single files representing complex 3D model assemblies into sub-objects, sub-assemblies, or parts, and allowing separated viewing and control of these sub-assemblies or parts. The system treats individual 3D model files as assemblies, and combines these with other assemblies or sub-assemblies as defined by other 3D model files together into one single master assembly. Also the system enables applying of operations to each assembly, either before reducing an assembly or building up an assembly. For example, a user could instruct the system to show them everything in a one meter radius of a particular part of a 3D model.

Figure 1B:
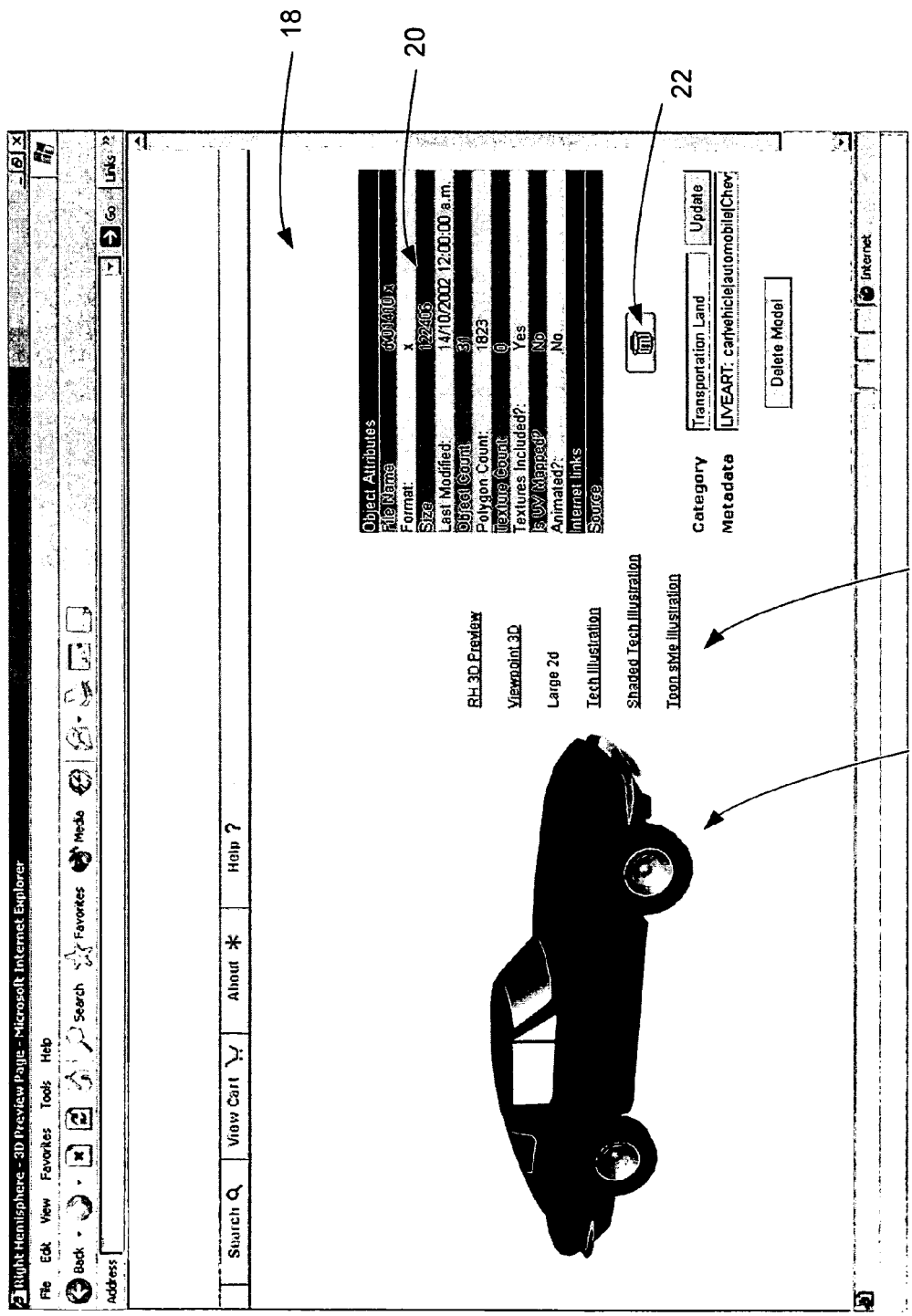
FIG. 1B is an example of a user interface screen showing a first alternative preview of a graphic in accordance with the present invention.

FIG. 1B shows a view screen 18 which in this example, shows a large two dimensional diagram of the graphic file named DV01410.X indicated as reference numeral 19. Also displayed in the preview screen 18 are the object attributes of the graphic file 20, including but not limited to the file name, the file format, the size of the file, when it was last modified, whether textures are included and whether it is animated. Also provided on the preview screen 18 are other formats of the graphic file, generally indicated as 21 in FIG. 1B. An example of five other formats which can be created by the system and viewable by the user are shown in preview screen 18, these are; a three dimensional preview in .RH file format, a three dimensional preview in viewpoint, a technical illustration, a shaded technical illustration and a toon style illustration.

Figure 1C:
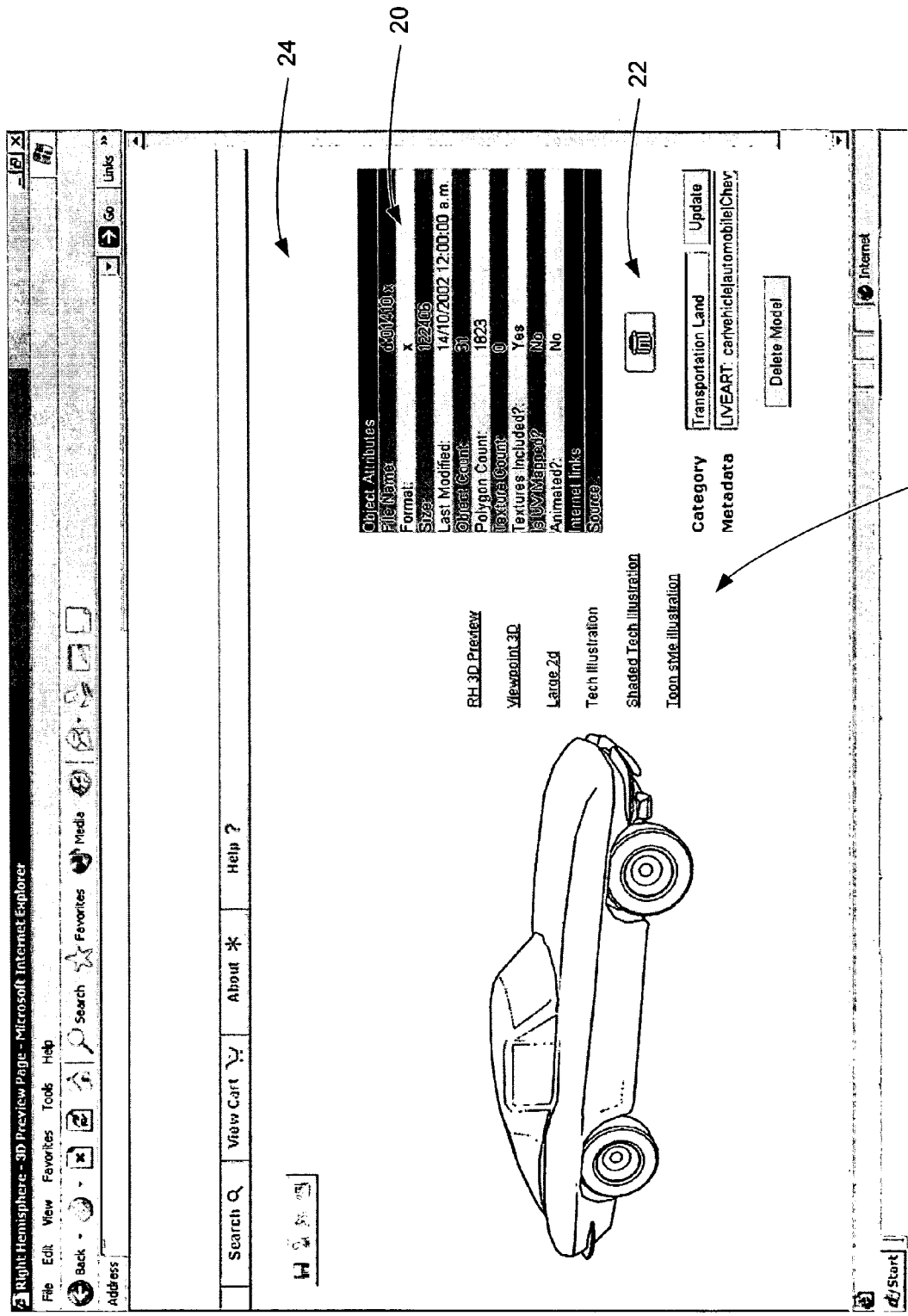
FIG. 1C is a second example of a user interface showing a second example of a graphic preview in accordance with the present invention.

If a user wishes to view any of the other formats 21 they can do so by using their mouse to click over each of the text indicating which format it is, for example, FIG. 1C shows the user interface 24 when viewing of the technical illustration 25 has been selected by the user.

Figure 2:
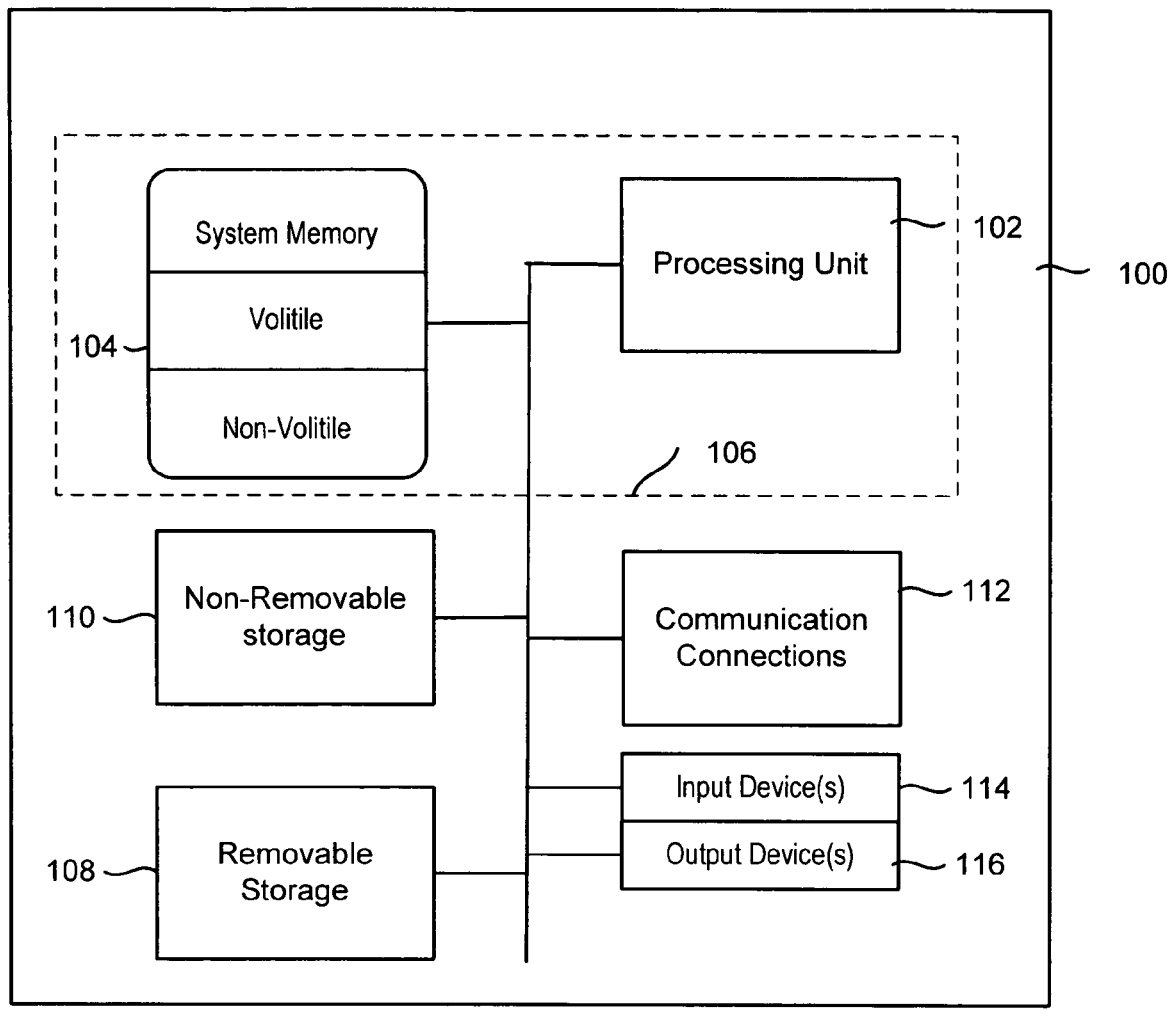
FIG. 2 is a block diagram of a processing system which may be utilized in accordance with the present invention.
Figure 3:
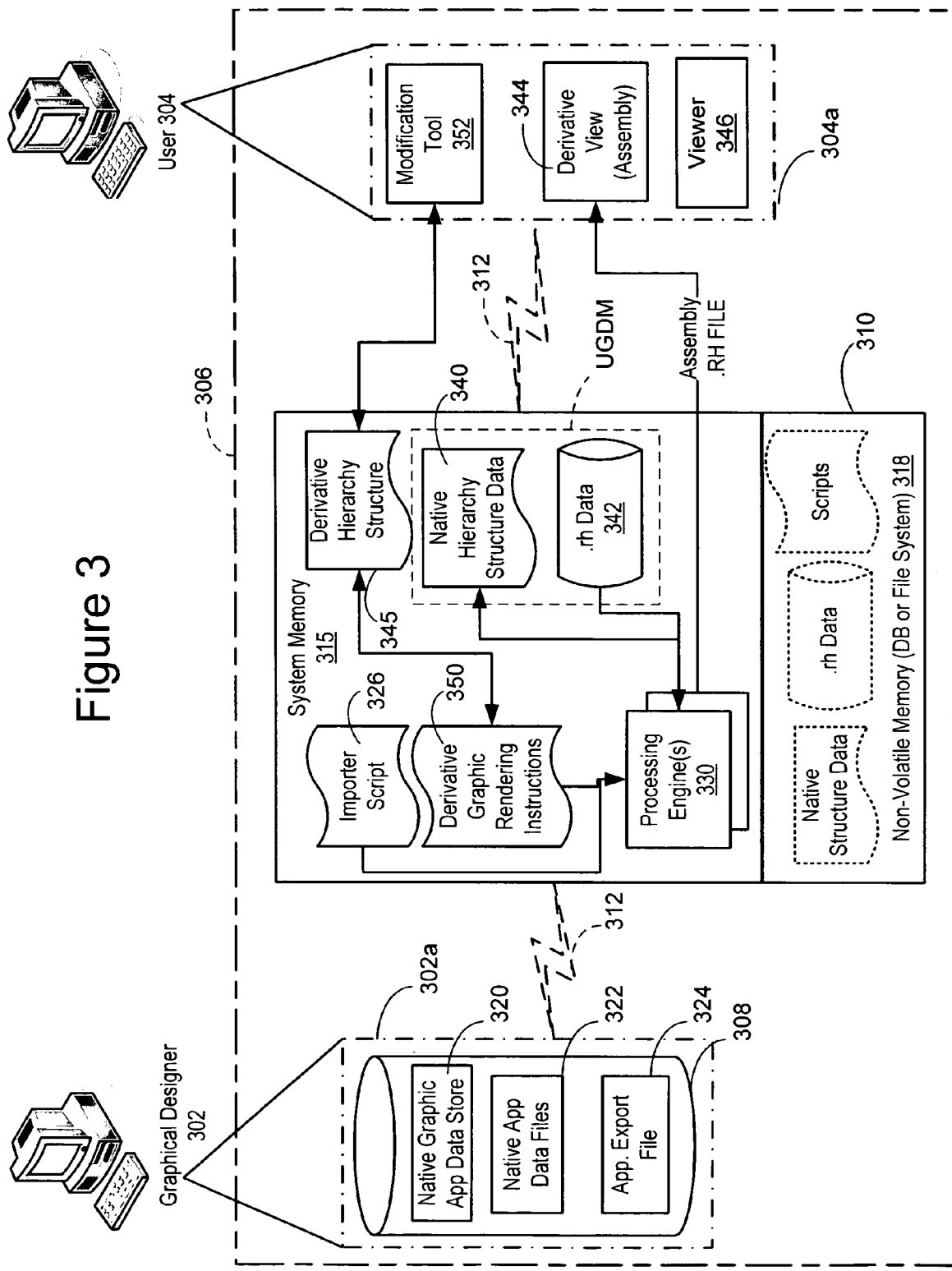
FIG. 3 is a block diagram of one embodiment of the system of the present invention.

FIG. 3 shows a functional block diagram of processing and data components comprising the system of the present invention. As discussed in additional detail below, each of the components shown in FIG. 3 may operate on one or more processing systems. With reference to FIG. 2, an exemplary processing system for implementing the invention includes at least one computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 2 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Returning to FIG. 3, as noted above, the invention includes a method and system for creating derivative, post native graphical data assemblies and renderings. In this context, it is noted that the term "render" may, to some, include a connotation of only producing two dimensional images. However, it should be understood that the term "render" in this context is used in the broader sense of any processing to convert graphics from a file into visual form, such as on a video display. FIG. 3 is a block level diagram illustrating the functional components and data structures utilized in the system and method of the invention. It should be understood that the components of FIG. 3 can be implemented on a single processing system and multiple processing systems. For example, in one embodiment, a graphical designer will utilize a processing system 302 to create graphical data 302A. This data 302A can be stored in data store 308 which can be located on the processing system 302, or a server processing system 306. This data will be created in some graphical application and stored in that application's native application data store 320. Likewise, user 304 can access system components 304A on a separate processing system where system components 304A are separate applications running on such processing system, or system components 304A may be stored on server processing system 306 and accessed by user 304 directly. Hence, in one embodiment both components 304A and 302A reside on a single processing system 306, and the graphical designer 302 and user 304 may access the server processing system 306 via the same or different terminals. In another embodiment, data 308 is stored on a separate processing system 302, components in box 310 themselves on a separate processing system, and the user 304 has a separate processing system.

Although such various embodiments exist, for purposes of the following description, it will be assumed that the processing environment for system 300 of the present invention is a client/server, networked environment such that graphical designer 302 has a unique processing system including a storage unit 308 which houses native graphical data 302A, and communicates with a server processing system 310 using a communication transport mechanism 312. Likewise, user 304 has unique processing system which includes components 304A of the present invention and communicates with server 310 via a network communication mechanism 312. It will be readily understood that the network communication mechanism may comprise any combination of public or private networks, local networks and the like, such as the Internet.

In general, the graphical designer creates native application data which is stored in data store 308. This native graphical source data may comprise data from any of a number of different applications such as AutoCad®, Microstation®, Solidworks®, etc. all of which have data in a native format which is accessed in a datastore 320 directly by the application. Such native data may alternatively be stored on the file system in data files 322, or may be exported to alternative file formats 324 such as IGES, (a common widely read CAD solids format,) supported by the native application and which can be read and imported by the system of the present invention.

System server 310 includes both system memory 315 and non-volatile memory 318. The system includes a processing engine 330 operating in system memory 315 which instructs the processor described above with respect to FIG. 2 to perform the task described herein.

As will be generally understood by one of average skill, the components of the system operating in system memory 315 may be stored in non-volatile memory 318 and loaded into system memory at runtime as instructed by a system controller (not shown).

The importer script 326 is constructed to interpret the native graphic application data store, native application data stored in files 322, or application data stored in exported files 324 which are in a format which the importer script can understand. It should be readily understood that manufacturers of graphical systems generally provide APIs to allow third parties to access their data in the particular format that they use. If such APIs are not available, one of average skill in the art can decode the data structure and provide the necessary instructions for importer script 322 to extract data information on the graphical data in the files of interest.

To incorporate native application data into the system of the present invention, the system server 310 uses an importer script 326 to convert the native cad data 302A into the UGDM. In one embodiment, the UGDM comprises hierarchal structure data 340 and binary (.RH) data 342. The UGDM is, in essence, a derivative or intermediate data format which is understood by the system and a viewer application 346. The hierarchical structure data 340 is referred to as native hierarchical structure data since it reflects the original, native structure of the data as generated by the native application. In one embodiment, the native hierarchal structure 340 is an XML data structure file. The binary .RH data 342 is described in additional detail below, but generally contains the information necessary to reconstruct the original view of the file, and cerate a derivative view 344. The hierarchy data structure 340 generally contains meta data on the information contained in the RH data file 342. Examples of the meta data contained in the hierarch data structure in XML format is shown in FIGS. 6 and 11-15.

When dealing with graphical data which comprises cad information, it will be generally understood that cad information may consist of assemblies of machines or designs which comprise a series of elemental parts. For example, a car is made up of suspensions, an engine and other elements, each of which is made up of smaller parts. The organization of the hierarchy of assemblies in a cad structure is distinctive to each organization and depends on the logical organization which makes sense to each individual organization and business process. Accordingly, the data in the .RH data file 342 can be on an atomic level, consisting of a single file for each part, or an assembly level, consisting of all the information in a given assembly comprised of a number of parts. Where the information is provided in assembly, the hierarchal structure of that assembly is stored in the hierarchical data structure 340. The importer script 326 controls a processing engine to create both the XML data structure and the RH data 342. In general, this universal graphical data model is a more efficient mechanism of storing the graphical data than, for example, the native cad data source 320.

Processing engine 330, XML data structure 340 and RH data 342 as well as the importer script 326 are all shown as being within system memory 315. It should also be noted that multiple processing engines 330 may be provided, with the processes described below with respect to assembling parts and processing them in the different RH files performed synchronously or asynchronously. In general, this is illustrated to show that these elements can be temporarily stored while the processing engine 330 operate in accordance with the processes described herein. It should be understood that the native hierarchy structure data, RH data, importer script and other elements can be stored in non volatile system memory 318. Permanent storage of the native hierarchical data 345 and .RH data 342 in non volatile memory is selectable by a user depending on the particular requirements of the server 310. When native hierarchy structure data and .RH data is stored in non volatile memory, such storage may be provided in a database or a simple file system configuration. In one embodiment, an Oracle system 9$i$ or 10$g$ database is utilized to store the data files.

Also shown in FIG. 3 is derivative rendering instructions 350. The derivative rendering instructions 350 are utilized by the processing engine 330 to provide a derivative view 344 which is desired by a user. The derivative view 344 is a new rendered view of the graphical data which may, in various embodiments, be a different two dimensional or three dimensional view of the original data. The derivative view 344 can comprise a new assembly, a new graphic, or any number of different types of graphical information. The derivative view may be viewed by a viewer 342 as described below.

The derivative view 344 may be as simple as a thumbnail, or as complex as a different assembly of a number of different parts. The derivative view is particularly useful for constructing a new assembly comprised of different components of a native cad assembly, or combining different elements from different departments such as a wiring diagram and mechanical robotic arm. Such components are generally designed by different departmental components of an organization.

In the example set forth below, construction of the new rendered view for a robotic arm is described. It should be recognized that the invention is not limited to processing assemblies or mechanical devices. The derivative view may be accessible to a viewer 346 which understands the output of the processing engine. In one embodiment, the new rendered view is a single .RH data file which may be read by the viewer. The viewer may include a web browser with a suitable 3D viewing plugin, a product such as Cosmos Creator available from Radish Works LLC, or any other of a number of standard graphical data authoring viewing environments which are modified to read the output .RH data structure.

In order for a user 304 to define the derivative view 344 that the user desires from the native CAD graphical data 302A, the user may be provided with a modification tool 352. The modification tool provides derivative rendering instructions 350 which operate the processing engines 330 to create the derivative view 344. Where the native data and derivative views comprise an assembly, the modification tool can modify the native structure data 340 to create a derivative hierarchy structure 345. It should be understood that the derivative hierarchy structure 345 may be edited by a modification tool 352 or may be modified by a simple text editor. As is well known, XML documents can be modified by text editing software. In addition, the derivative data (and native structure data) need not be provided in XML format, but may be provided in other text file formats. Generally, in one embodiment of the invention, the modification tool 352 outputs the derivative structure file 345 in a manner which reduces errors.

FIG. 4 shows an overview of the general process of the present invention for creating a derivative view 344. While the process is described in the context of creating a derivative CAD assembly, it will be recognized that more simple forms of derivative views may also be created. At step 402, native graphical data, in this case CAD data, from the native graphical application or a commonly understood export file is extracted from the file. As noted above, this information may be extracted using an API provided by the graphical system manufacturer, the known structure of the export file, or the data structure of the file may be reverse engineered according to well known techniques. This step is performed under control of the importer script 326. At step 404, the processing engine 330 under the control of importer script 326 creates an .RH data file 342 and a native hierarchy structure file 340. The UGDM may take a number of different formats, and it should be recognized that the .RH data file is merely one implementation of the present invention. Other data structures can be used to store the graphical data associated with the structural data of the graphical design information 302A. Optionally, at step 406, native hierarchy structure file 340 and .RH file(s) 342 may be stored in non volatile memory 318. It should be recognized that information need not be stored if the importer script stores the data in system memory, the derivative instructions operate immediately to provide the derivative view 344, and then the system discards the information.

In one aspect, where the graphical information 302A comprises a CAD assembly comprised of various different parts, .RH data file 342 will comprise a series of part.RH files, one for each part or at the most elemental level of the structure in the assembly hierarchy. The part.RH assembly hierarchy structure will be stored in the native hierarchy data structure 340.

Next, at step 408, derivative rendering instructions 350 controls the processing engine to construct a derivative view. Where the derivative view is a new assembly, the processing engine will determine which parts in RH data 342 needs to use to assemble the derivative view 344 based on the derivative hierarchy structure 345. Other changes to the derivative assembly view, such as view styles (wire frame, toon, 2D, 3D, etc.) may also be controlled. Next, at step 410, the processing engine 330 will process the part level RH files as described further with respect to FIG. 10. Once all the part level RH files are processed, a single new RH file of the derivative rendered view 344 is complete. Next, at step 412 the derivative RH data file will be provided to viewer 346. Again, an optional saving step 414 may occur to save the assembled view RH data 344 to non volatile memory. The process is then completed.

An example of the creation of the derivative view from original data will be described with respect to FIGS. 5, and 11 through 15. In this example, the original data is a CAD assembly of a robotic arm and the derivative view is a new assembly based on the original native assembly.

Figure 6:
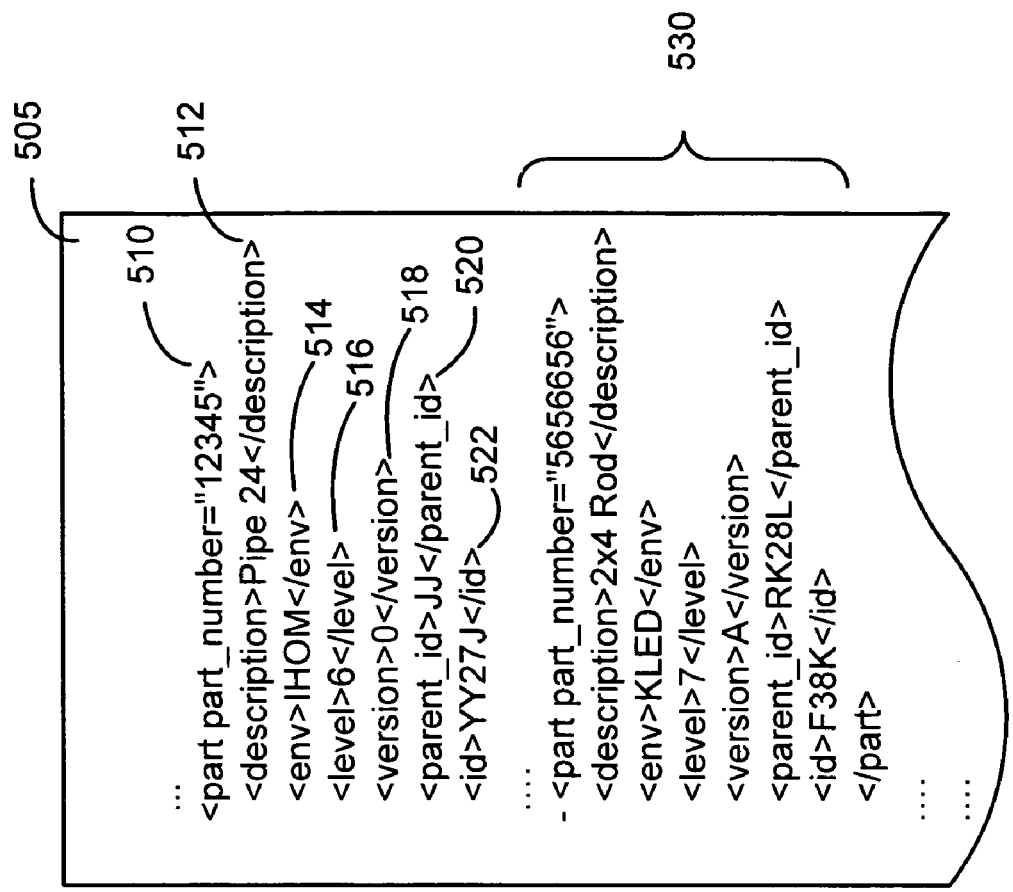
FIG. 6 is a sample of part definitions in XML format.
Figure 5:
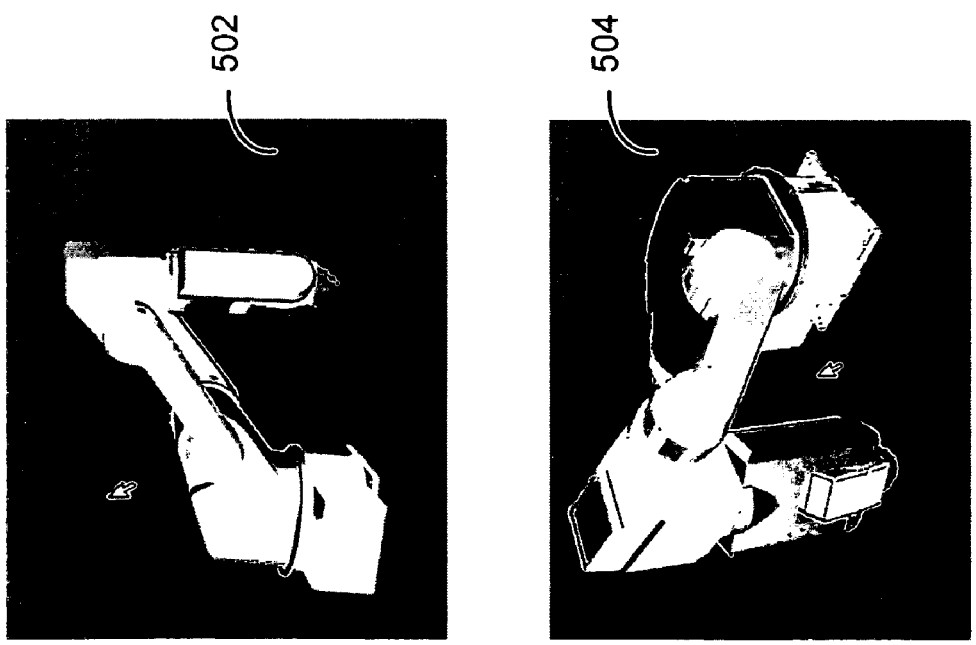
FIG. 5 is an illustration of two views of a robotic arm.

FIG. 5 shows two views 502 and 504 of a robotic arm including a number of component parts thereof. FIG. 6 shows a portion 505 of an XML representation of a native parts in data structure file 340. The portion 505 shows meta data of two parts of the robotic arm assembly shown in views 502 and 504 identified by a part designator and a file identifier. As shown in FIG. 5, an exemplary part number 510 has a unique identifier number, which in this case is "12345". Other meta-data elements which may be included in the part definition are a "description" 512, an "environment" identifier, a "level" identifier 516, a "version" identifier 518, an identifier of a parent part 520, and a unique part I.D. 522. In this example, part 12345 will have created for it a unique .RH file YY27J.RH will contain all the graphical rendering information for the part. Likewise another part 530 has its own unique identifying information.

It should be understood that the type of meta data identified in portion 505 is exemplary only. The meta data may be expanded to include any number and types of data. Because XML is extensible, new data types may be defined and the XML data definition to include any number of different tags and types of data. As noted above, the hierarchal structure 345 need not be an XML structure, but may in actuality be a simple text structure. This data may be utilized by the derivative rendering instructions 350 and incorporated into the modification tool 352 to allow users even greater flexibility in rendering new rendered views and incorporating different types of data.

While FIG. 6 shows an example of data which may be incorporated into each individual part, FIGS. 7A and 7B show an example of a portion of a XML data structure 340 illustrating the hierarchy between the number of different parts. FIG. 7A shows exemplary portion of an XML document 600 which defines four different parts. A first part number 1234 identified at line 602 has a description tag 604, parent identifier 606 and an I.D. tag 608. Likewise part 2345 has a part I.D. number 610 includes its own unique I.D. 612 and a tag 614 which identifies the file name of any parts which make up the top level part. In addition, it is noted that the parent identifier tag 616 in part number 2345 identifies parent I.D. 1111, which the I.D. of part number 1234. Likewise part number 3456 identifies as its parent part number 1111 while part number 4567 identifies as its parent part number 3456 (I.D. 333) and comprises a number of different files (part 4_1 through part 4_8). The file name refers to the original native data file designation. In the structure shown in FIG. 7A, the children parts are identified relative to their parents. Parents may comprise sub-assemblies, as illustrated in FIG. 7B. As shown in FIG. 7B, parts 2222 and 3333 comprise a top part 1111.

There are two basic input types used for the XML part description shown in FIGS. 6 and 7A. CAD data is generally stored in terms of a body position, which is an absolute position within a 3D model. Alternatively, CAD data is defined in terms of a 0, 0, 0 position and a transformation matrix. In the latter case, the XML will hold a transformation matrix for the data. The body position type of data requires that data be stored individually for each instance of the part which occurs. In other words, eight bolts in the robot will require eight part entries. The transformation matrix type of data enables CAD data to be stored once for each instance, and transformation data stored to enable the part to be moved to a different position as required. In other words, the eight bolts only require one cad entry and eight transformation entries.

An XML representation of transformation CAD data is illustrated in FIG. 6C. For XML descriptions of parts including transformation data, coordinates are added as tags within the part description. The advantage of storing information in a transformation entry is that if the bolt drawing changes, only one entry in the cad data must change, and all subsequent visualizations will include the new part. Using the body position method, every entry for a bolt must be replaced. In the example shown in FIG. 7A, a body position method will require six different parts, while the transformation index of FIG. 7C will require a single part with different transformation as illustrated by part number 4567.

Figure 8:
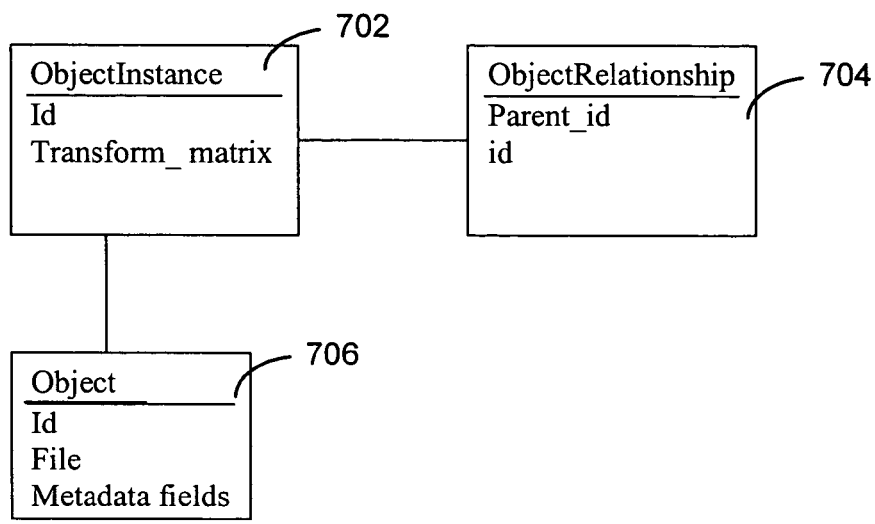
FIG. 8 is a block level illustration of the substantiation of objects in a database in accordance with the present invention.
Figure 9:
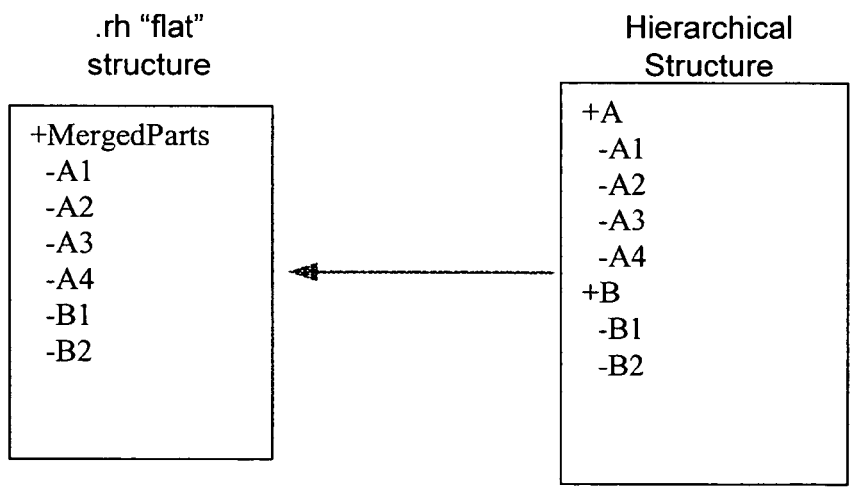
FIG. 9 is an illustration of the conversion of the hierarchal structure of an assembly to the flat file format of the present invention.

FIG. 8 illustrates how XML documents are parsed into the database. Each object instance 702 includes a part I.D. and the transformation matrix of the individual part (if the part is stored in transform data). An object relationship class 704 stores the parent I.D. and the part I.D. for each part, and each object 706 has its I.D., file, and meta data fields.

FIG. 8 illustrates how the hierarchical structure of a CAD file is converted to the light weight .RH file format. The hierarchical structure 800 is converted to a merged binary file comprising the part .RH files for each part. This merged .RH file, and the part .RH file, can be stored in a database as BLOBS. As should be readily understood, BLOBS are "binary large objects." BLOBS generally comprise a large binary file. When a database manager sees a BLOB file, it has no way of understanding what is in the file. Therefore, the data structure stores the BLOB in the database as a simple binary. It should be recognized that the storage of the RH file in the database is not required for the present invention. The binary format of the RH file allows the processing engine to rapidly generate new binary files to provide the newly rendered view 344. Alternatively, the part.RH or merged .RH files can be stored in a file system, as described above.

In general, the RH file is made of chunks. Each chunk describes what information is to follow in later chunks and what each chunk is made of. Each chunk includes a primary chunk which has a primary I.D. and is always the first chunk in the file. Any number of different types of chunks may be provided. One advantage of this format is that in can be utilized to add and delete data and data types as requirements of the native data change. Hence, the below description of the different types of chunks included in an exemplary .RH file is not exhaustive.

Within the primary chunk are one or more optional main chunks. These chunks may include a THUMB, INFO, VERSION, ZLIB, PICTURE, MATERIAL, NODE, SCENEAMBIENT (scene ambient), SCENEILLUM (scene illumination), UNITS, key frame data (KF), control transform (CONTROLTM), parameter (CONTROL PRM) control, and SKIN (object skin). By way of example, the "thumb"

chunk contains a thumbnail image in jpeg format. The "info" chunk contains ASCII information about a file and what application exported the native file format. A "version" chunk identifies information on an associated API for the .RH formation, and a minimum version of the system which may be able to view the file.

The .RH file may optionally include a compressed chunk, referred to generally as a ZLIB. If the ZLIB chunk exists, the chunk is compressed and should be uncompressed with ZLIB (a standard compression library). Once the file is decompressed, the viewer 346 may import the information as usual. This chunk may contain other chunks including, PICTURE, MATERIAL, NODE, SCENE AMBIENT, SCENE ILLUM, UNITS, KF, CONTROLTM, PRMCONTROL, AND SKIN.

Other examples of chunks which may be provided in the .RH format. A "picture" chunk may contain a single picture data. A "material" chunk contains data on the type of material an object should be displayed as being composed of. It may include additional classes such as colors, opacity, specular level, glossiness, reflection, refraction, and shading. For example, a shader chunk may contain real-time shading information and be a child of the material chunk. A mapping chunk may contain a material map and be a child of the material chunk. It may include an index chunk including an index of a picture, a map file, a map matrix, a map amount, and a mapping UV channel. The control TM chunk can include items such as a rest matrix, a 3D pivot point, a transformation flag, a position track, a scale track, a rotation track, and a morph track. The PRM control chunk can include a target identifier, a controller parameter, the type of control parameter, and a single key of the parameter controller. The skin chunk contains skin data of one mesh object. It can include a vertex list of 3D points, an array of bone identifiers, a matrix of resting points, and skin data.

A "node" chunk may comprise a pointer to another chunk. A "scene ambient" chunk includes data on ambient color data. A "scene illumination" chunk is a global scene illumination color. A units chunk contains a unit identifier for the graphic. A KF chunk contains key framing data. A control TM chunk may contain a single transformation controller. A PRM control chunk may contain single parameter controller. A skin chunk contains skin data for the object. A map chunk contains data for one material map which may include an index of a picture and an RH file, a picture file name, an amount of mapping, the UV channel for mapping, and other information.

The node class is the interface to nodes in the scene. It provides methods to access various parts of the node such as its name, transformation, parents and children.

Other information which may be included in the RH file include lines, faces, light information, bone information, camera specific information, procedural specific information, sprite specific information, a position track, a scale track, a rotation track, a morph track, a morph key, TCB data, parameter control, skin information, and color information. A lines chunk may be provided which includes data such as line sizes, and line data. The lines chunk can be a child of the node data chunk. A faces chunk can be a child of the node data chunk and include an array of all points on a face element and other face data. A BONE chunk contains rendering data for human or animal bones. A CAMERA chunk can be a child of the node data chunk and local space camera position information.

A generic chunk which may contain common data for a generic class may also be included and may comprise a child of the material or node chunks. The information contained in the generic chunk can include a name string, an object information string, an object ID string, and other custom data When the .RH file is delivered to a viewer application 346, it creates an object which represents an random, editable, polygon/polyline mesh. All objects rendered in the scene are represented in this class. Objects consist of points and faces, each point is specified by a point structure which is constructed using three coordinates X, Y and Z. Polygons can be stored without triangulation. Due to this feature, the initial object structure is preserved, the process for writing plug ins is simplified, and the quality of conversion to other formats is raised. The mesh object can store any vertex text and face information, including vertex colors, normals, texture coordinates, and the like. The object may be defined in solids form, a description of the object as mathematical entities like Non Uniform Rational B-Splines (NURBS). This format is more directly related to the original CAD data than polygons but is effectively describing the same surface. This format can be used so machines can tool a curve without approximating it with a number of straight lines. Hence, representations in rh format of geometries can be solids, polygons, and simpler curves limited to 2D for purposes of drawing. Additional meta information can also be stored.

FIG. 10 represents the process for creating individual parts into part .RH files, and creating a derivative view .RH file based on instructions set 350. The process of FIG. 10 assumes that the native data structure 340 and part .RH data 342 have been created by importer script 326 and exist in system memory 315 or non-volatile memory 318. If the system is required to render a simple thumbnail or other two dimensional image, the importer process 326 may simply pass of the .rh data to a conversion method, which renders a jpeg or other image format file, and the process of FIG. 10 need not be implemented. However, it is advantageous to convert and store the any part data as in the .rh file format for further processing.

The process begins at step 902, where the new structure or hierarchy for the assembly 345 is determined. If the derivative view 344 is simply a thumbnail, an appropriate process can be called to create the thumbnail (from the .rh file) and the file output (as per step 412). That is, steps 916 and 920 will always be "no" and the thumbnail rendered as a simple part.rh file.

For purposes of this description, the process is described as operating on an assembly comprised of a number of individual part files in the native graphic application format. At step 906 the derivative hierarchal structure 345 is parsed to determine the new assembly structure. The hierarchy and part information is recorded into a data structure in system memory for use in constructing the derivative view. This includes recording the relationship between the parts in the hierarchal structure as described in the derivative structure file 345, and marking each part record "ready for processing" at step 908. At step 910, the first or next part which is marked "ready for processing" is retrieved. At step 912, the part retrieved in step 910 is converted to a part.RH file. Once converted to a part.RH file, at step 914, the part is flagged as processed. At step 916, the method determines whether additional parts at the same level in the hierarchy need to be processed. If so, it loops to step 910. Once all the RH files for a given level in the hierarchy are processed, at step 918, the parts for this stage are merged into a sub-assembly RH file. At step 920, the method checks whether additional stages of sub-assemblies require processing, and if so, loops back to step 910. The method loops until all parts which are part of the structure are completed.

At the highest level in the hierarchy, at step 922, the assembly is merged into a single .RH file. At this point, the system will have a RH file of part level data for the parts stored in the new hierarchical structure.

Because different levels of the assembly can be processed by different processing engines, asynchronous processing of the assembly may occur. That is, steps 910-920 can occur on different processing engines.

It should be recognized that this process may occur by importing and storing all part.rh files for an assembly, and then processing the new assembly according to the steps in FIG. 10, or the processing of native data to part.rh files may occur simultaneously with the building of the derivative assembly as part .RH files are imported.

Figure 11:
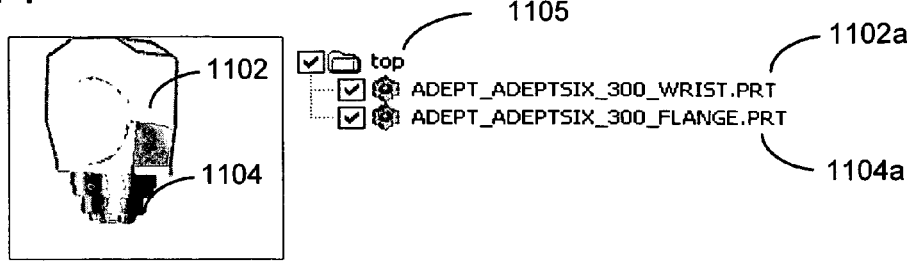

This process is graphically illustrated in FIGS. 11 through 15. FIG. 11 illustrates a portion of the robot assembly shown in FIG. 5. In this case, a wrist portion 1102 and a flange portion 1104 are shown. Each part is originally constructed from an associated PRT file 1102A and 1104A which are subparts of an assembly "top" 1105. In this case, as shown in FIG. 11, the wrist PRT file 1102A and flange PRT file 1104A are parts of the sub-assembly "top" and .have been processed, so all are "flagged" as done. Because both of these files have been converted to RH part files, they can be merged into a single top.RH file.

The graphical hierarchy illustrates a tree view of how component part files are used to construct assemblies. In FIGS. 11-15, the tree view includes check boxes and check marks. These check boxes represent what a user might see using the modification tool to select or de-select these components as part of the derivative view. In this case, a PRT file is a file associated with a 3D graphics program, such as ProEngineer, by Parametric Technology Corporation or Unigraphics NX from UGS PLC.

Figure 12:
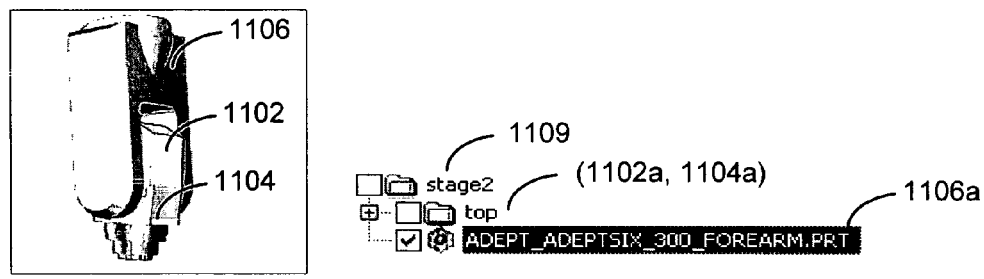
Figure 13:
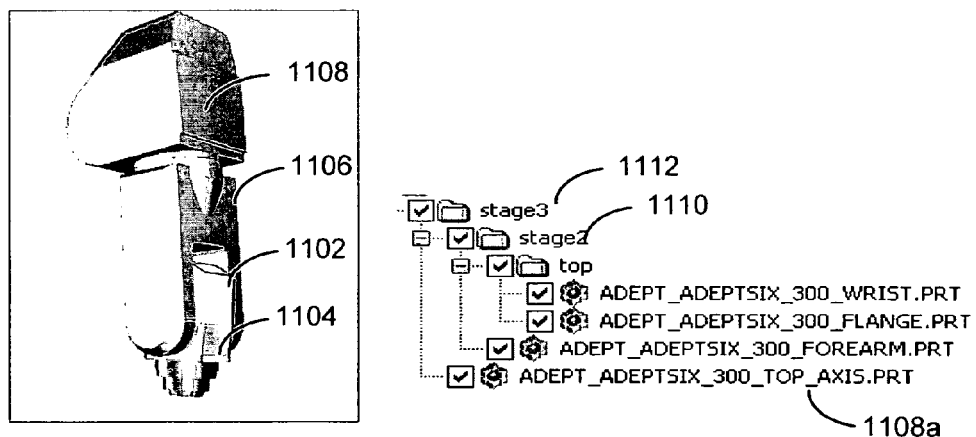
Figure 14:
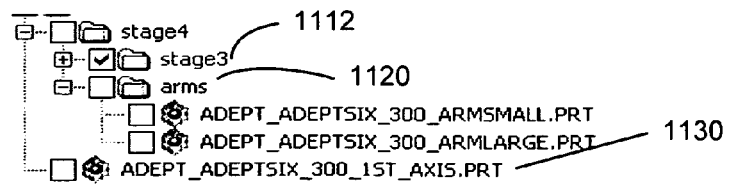

Next, at FIG. 12, it will be noted that the "top" assembly 1105 is completed and a "stage 2" assembly 1109, which is the next level higher in the hierarchy, also includes a forearm part 1106 which is associated with the forearm PRT file 1106a. Parts 1102, 1104 and 1106 illustrate how each new part file is added to the assembly view. Next, at FIG. 13, a new stage, stage 1112 is shown. Stage 3 includes a top axis part 1108 and all of Stage 2. Top axis part 1108 is associated with a top axis PRT file 1108. Likewise in FIG. 14, stage 4 is comprised of Stage 3, an "arms" subassembly 1120 which includes a small arm 1122 and large arm 1124, as well as a first axis 1130. In accordance with FIG. 10, every few seconds, the data structure is interrogated by one or more processing engines. Parts marked ready for processing are set to a queue in a processing engine. A processing engine retrieves parts within the queue and creates the RH file for each part defined by the process in the queue.

Assembly processing is handled in the same manner. Every few seconds a table in the database is interrogated to find assemblies such as stage 2, stage 3, stage 4, stage 5 that are ready. Finally, using a merge operation, as indicated at step 922, all parts and subassemblies are merged into a single assembly until all assemblies are done. Essentially, this is a single RH file. If the data structure is stored in system memory 315, it is technically not a file, but a serial stream having the same data structure as the RH format described above.

FIG. 15 illustrates the new derivative view of robot 1500 which comprises a number of stages (2-5) showing the various subparts assembled together.

The merge operation begins with individual parts being converted to .RH files and when each part in the assembly is ready to process, the assembly itself is ready to be processed. This again is illustrated at FIG. 11 where two parts comprise a single top assembly. The method continues until all parts and assemblies are flagged and set to be completed. At each step, only the .RH parts and assemblies one level below require merging. In this manner, different portions of the assembly can be processed by different processing engines 330.

It should be noted that in general, the RH file is derivative of the original PRT file. In this current text, the RH file need not be the only format which is created by the process in the engine. Alternatively, other formats, such as jpeg, bit maps, animations, and other formats, may be utilized in place of the .RH file. Other examples include a thumbnail, a technical illustration, a cartoon style, a custom angle, or any other file. As noted above, the RH file is a three dimensional file and can be rotated to the angle viewing the complete model from any angle by the viewer 346. In all parts of process, status flag is set in the database and once all children parts are in the assembly process, the status flag to the assembly is set as shown in FIG. 15.

To load the entire assembly into a viewer, the new rendered view 344 is new .RH file which, in one example, can be called robot .RH. Once loaded for viewing in viewer 346, the entire assembly and each individual part in the assembly can be viewed on its own or in conjunction with related parts, and get a greater understanding of the robot.

As illustrated in FIG. 16, the method and system of the present invention also enables forming assemblies from data from different departments of the enterprise, and from different graphical originating programs in the enterprise. For example, the control system for the robot 1500 may be developed by an electrical department. In this case, the electrical department will provide a set of data 302A1 as illustrated in FIG. 16. Different department, for example, the mechanical department may have created the mechanical parts for the robot, generating the data source 302A2. In this case, even if data source 302A1 and 302A2 are provided by different programs, such as AutoCad and MicroStation, the system of the present invention will parse them into the hierarchy and .RH part files, and can reassemble them into a new rendered assembly 344. So, for example, if there is an interesting view in the control wiring for the robot in conjunction with connection points in the relative assembly, the robot then wiring are converted to .RH files, and new XML hierarchy structure 345 is created for .robotRH and wiring.RH, and the process is run to create a brand new assembly 344.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for creating a graphic view of a part, comprising:

extracting graphical data in a native application format, the graphical data includes a plurality of parts and includes an assembly including a hierarchical relationship for said plurality of parts;

converting said graphical data from the native application format to a derivative graphical data format, wherein said converting includes providing a binary derivative graphical file for each said part;

receiving an instruction to provide a derivative view; and creating a derivative view of at least a portion of the graphical data from the derivative graphical data format.

2. The method of claim 1 wherein the native application format is included in a data store for a graphical application.

3. The method of claim 1 wherein the native application format is a commonly understood export file from a native application.

4. The method of claim 1 wherein said graphical data is CAD data.

5. The method of claim 1 wherein said step of converting includes providing a hierarchical data file.

6. The method of claim 5 wherein said hierarchical data file is in XML format.

7. The method of claim 1 wherein the derivative view is a three-dimensional view.

8. The method of claim 1 wherein the derivative view is a two-dimensional view.

9. A method for creating a graphic view of a part, comprising:

extracting graphical data in a native application format;

converting said graphical data from the native application format to a derivative graphical data format;

receiving an instruction to provide a derivative view; and creating a derivative view of at least a portion of the graphical data from the derivative graphical data format;

wherein said step of creating includes providing a binary derivative graphic file.

10. The method of claim 9 wherein the derivative view is a composite of a plurality of binary part files.

11. The method of claim 10 wherein said receiving step includes receiving a modified hierarchical data structure of parts.

12. A method for creating a graphic view of a part, comprising:

extracting graphical data in a native application format;

converting said graphical data from the native application format to a derivative graphical data format;

receiving an instruction to provide a derivative view; and creating a derivative view of at least a portion of the graphical data from the derivative graphical data format;

wherein the derivative view is an assembly view constructed of a plurality of binary derivative part files.

13. A method for creating an assembly visualization, comprising:

extracting graphical data from a CAD system, said graphical data including rendering data and a hierarchical structure;

for each part in the assembly, creating a binary data representation of the part;

receiving a new hierarchical structure for a new rendering view; and creating a binary merge file of a rendering the new assembly based on said part assemblies and said new hierarchical structure.

* * * * *